(12) United States Patent
Brown

(10) Patent No.: US 6,447,238 B1
(45) Date of Patent: Sep. 10, 2002

(54) TRUCK TRAILER WITH MOVABLE TAILGATE ASSEMBLY

(76) Inventor: Pete Brown, Rte. 1, Macedonia Rd., Danielsville, GA (US) 30633

( * ) Notice: Subject to any disclaimer, the term of this patent is extended or adjusted under 35 U.S.C. 154(b) by 0 days.

(21) Appl. No.: 09/516,964

(22) Filed: Feb. 25, 2000

Related U.S. Application Data

(63) Continuation of application No. 09/034,914, filed on Mar. 4, 1998, now abandoned.

(51) Int. Cl.[7] .................................................. B60P 1/36
(52) U.S. Cl. ..................... 414/502; 414/528; 239/672; 239/689
(58) Field of Search ................................ 414/502, 528; 239/672, 674, 671, 689, 663

(56) References Cited

U.S. PATENT DOCUMENTS

| | | | | |
|---|---|---|---|---|
| 2,275,799 A | * | 3/1942 | Oklejas | 414/523 |
| 2,615,587 A | * | 10/1952 | Beyer et al. | 414/502 |
| 3,074,727 A | * | 1/1963 | Sosalla et al. | 239/689 |
| 3,754,711 A | * | 8/1973 | Gledhill | 239/674 |
| 3,917,084 A | * | 11/1975 | Swisher, Jr. et al. | 414/528 |
| 4,055,265 A | * | 10/1977 | Elsenman | 414/528 |
| 4,169,559 A | * | 10/1979 | McKee | 239/672 |
| 4,919,553 A | * | 4/1990 | Speakman, Jr. | 414/528 |
| 5,618,002 A | * | 4/1997 | Cervelli et al. | 239/672 X |
| 5,842,649 A | * | 12/1998 | Beck et al. | 239/689 X |

* cited by examiner

*Primary Examiner*—Steven A. Bratlie
(74) *Attorney, Agent, or Firm*—Womble Carlyle Sandridge & Rice, PLLC

(57) ABSTRACT

A truck trailer for hauling gravel, sand and other particulate materials includes a trailer body having a first conveyor extending along the bottom of the trailer, and a second conveyor that extends upwardly at an angle with respect to the first conveyor for conveying the gravel toward the rear or discharge end of the trailer. A movable tailgate assembly is mounted at the discharge end of the trailer and is movable between a lowered, non-engaging position to enable the gravel to be discharged from the trailer in discrete piles, and raised spreading positions for spreading the gravel across a prescribed area.

14 Claims, 5 Drawing Sheets

TRUCK TRAILER WITH MOVABLE TAILGATE ASSEMBLY

CROSS REFERENCE TO RELATED APPLICATION

This application is a continuation of application Ser. No. 09/034,914, filed Jun. 4, 1998 now abandoned.

FIELD OF THE INVENTION

The present invention relates to a truck trailer for hauling gravel, crushed rock, sand, and other particulate matter. In particular, the present invention relates to a truck trailer for hauling particulate or granular materials, which has an internal conveyor system for conveying the particulate matter along the length of the trailer bed, and a movable tailgate assembly mounted at the discharge end of the trailer bed and movable into desired positions beneath the discharge end of the trailer bed to enable the particulate matter to be discharged in discrete piles or spread evenly over a desired area.

BACKGROUND OF THE INVENTION

Gravel, crushed rock or stone, sand, feed, and other particulate materials typically are transported from a quarry or loading site to a dump site in open bed truck dump trailers that are generally pulled by a semi truck. Once at the dump site, the end of the dump trailer nearest the truck cab generally is raised or lifted so as to cause the material therein to flow toward the rear or discharge end of the dump trailer to dump the particulate material at the site.

Depending on the size of the dump trailer, the dump trailer can be extended or raised up to as much as 30 feet in the air. The problem with most conventional dump trailers is that when they are raised to their fully extended position, they tend to create a dangerous, top-heavy condition, especially with heavier loads such as crushed rock or gravel. As a result, there is a significant danger of tipping or rolling over when the dump trailers are in their raised positions, creating a hazard to both the equipment and the operators. The danger of tipping or rolling over is further increased when the dump trailer is being used to dump materials over uneven or slick ground as is commonly found at construction sites. There is also the danger, especially along roadways with overhanging power lines, that the raised dump trailer could come into contact with such overhanging power lines as the operator has to move the truck forward to complete the dumping of the materials, creating a danger of electrocution.

In addition, when conventional dump trailers are raised so as to dump their load of material, typically all of the material tends to flow to the rear or discharge end of the trailer under the force of gravity. As a result, there is little or no ability for the operator to control the distribution of the material, but rather the material instead tends to be dumped in a large uncontrolled mass. It is also sometimes necessary to jog or bounce the trailer to dislodge any additional particulate materials and to insure that all of the material is dumped from the truck as the discharge end becomes blocked by the growing pile of material. The shifting of the load toward the rear of the dump trailer further puts greater stress on the rear of the trailer and on the ability of the truck to pull such a load, especially when going up hills.

Attempts have been made in the art to develop conveyor systems for truck trailers that will enable the discharge of granular or particulate materials from the dump trailer without requiring the trailer to be raised for dumping of the materials. For example, U.S. Pat. No. 4,923,359 of Petri, et al. and U.S. Pat. No. 5,102,285 of Gust show gravel hauling or delivery trailers having conveyors for urging or conveying the particulate materials contained therein from one end of the trailer to the rear of the trailer for discharge. While such assemblies provide a mechanism for discharging granular or particulate materials without requiring the bed of the trailer to be lifted or dumping the material, such conveyor systems are limited in their ability to convey the material and further in their ability to control the discharge of the material to enable spreading of the material across a desired area or for dumping of the material in discrete piles as needed or desired without requiring additional attachments or devices.

Accordingly, it can be seen that a need exists for a truck trailer for hauling and distributing gravel, crushed stone, and other particulate materials, which enables safe and efficient distribution of the material with the ability to control such distribution for even spreading over a desired area or dumping in discrete piles as needed.

SUMMARY OF THE INVENTION

Briefly described, the present invention relates to a truck trailer of the type designed to be attached to and pulled behind a truck or tractor rig for hauling gravel, crushed rock, sand, feed and other particulate or granular materials. The truck trailer includes a trailer body having sloped side walls, a front end and a rear or discharge end, which define a basin or bin in which the particulate materials, such as gravel, are contained. A first conveyor is positioned on the bottom of the trailer body that extends from a first end at or adjacent the front end of the trailer body, and a second or discharge end positioned at an intermediate point along the length of the trailer body. A second conveyor assembly is mounted within the trailer body, extending upwardly at an angle with respect to the first conveyor. The second conveyor includes a first or lower end that is positioned beneath the discharge end of the first conveyor, and an upper or discharge end positioned at the discharge end of the trailer body.

Each of the conveyors includes a pair of parallel conveyor chains extending about an endless, substantially elliptical path and having a series of cross-braces at spaced intervals that extend between and are attached to each of the chains. Flexible conveyor members, or belts, typically formed from rubber or similar flexible materials are mounted to the cross-braces with the conveying members slightly overlapping so that the conveying members can flex and roll over to urge the gravel from the first conveyor onto the second conveyor and from the second conveyor out of the discharge end of the trailer body. The first and second conveyors thus form a movable floor for the trailer body, with the first conveyor forming a first movable conveyor section and the second conveyor forming a second movable floor section.

Each of the conveyors is connected to a drive system for rotating the conveyors about their conveying paths. Typically, the drive system includes a series of drive motors mounted at the second or discharge ends of the first and second conveyors, connected to the conveyors in a driving relationship. The motors can be electric motors, although typically hydraulic motors will be used, with the motors being powered through hydraulic lines connected to hydraulic pumps that are in turn connected to the power take-off assembly of the truck. The drive motors for each of the first and second conveyors generally are arranged in pairs of motors mounted on opposite sides of the trailer body and connected to drive sprockets for each of the conveyors.

Separate drive controls are provided for the drive motors for each of the conveyors. The speed of the motors can be controlled using the controls, with the second conveyor generally being run at a constant, full speed and the first conveyor run at varying speeds as necessary.

A movable tailgate assembly is mounted at the rear of the trailer body for receiving the gravel, crushed rock or other particulate materials from the second conveyor. The tailgate assembly includes a tailgate that is movable between a lowered, non-engaging position and a fully raised, spreading position. The tailgate includes an elongated body and a series of spaced partitions or dividers for channeling or dividing the flow of particulate materials across the tailgate for spreading the material over a desired area. A hydraulic cylinder is pivotally mounted to the truck frame and is pivotally attached to the tailgate. A hydraulic control is provided for controlling the operation of the hydraulic cylinder of the tailgate assembly so as to cause the tailgate to be moved between its raised and lowered positions as needed for discharging the particulate material in discrete piles or spreading the particulate material over a desired area.

Accordingly, the trailer body generally is loaded with sand, gravel, crushed rock or other particulate material and is driven to a job site for the discharge of the material. At the site, the controls for the first and second conveyors are engaged so as to urge the particulate material toward the discharge end of the trailer body. Depending upon the manner in which the material is to be discharged, the tailgate is left in its lowered, non-engaging position or raised to a desired spreading position. If the material is to be simply dumped in discrete piles, the tailgate is left in its lowered position and the particulate material is urged off the second or discharge end of the conveyor into a pile below the discharge end of the trailer. If the material is to be spread over a desired area, the tailgate is raised to a desired spreading position depending on the area to be covered, and the material is fed onto the tailgate which causes the material to be spread across a wider area as the truck is moved forward such as for applying a layer of crushed rock along a roadbed for paving.

Various objects, features and advantages of the present invention will become apparent to those skilled in the area upon reading the following specification when taken in conjunction with the accompanying drawings.

DETAILED DESCRIPTION

Figure 1:
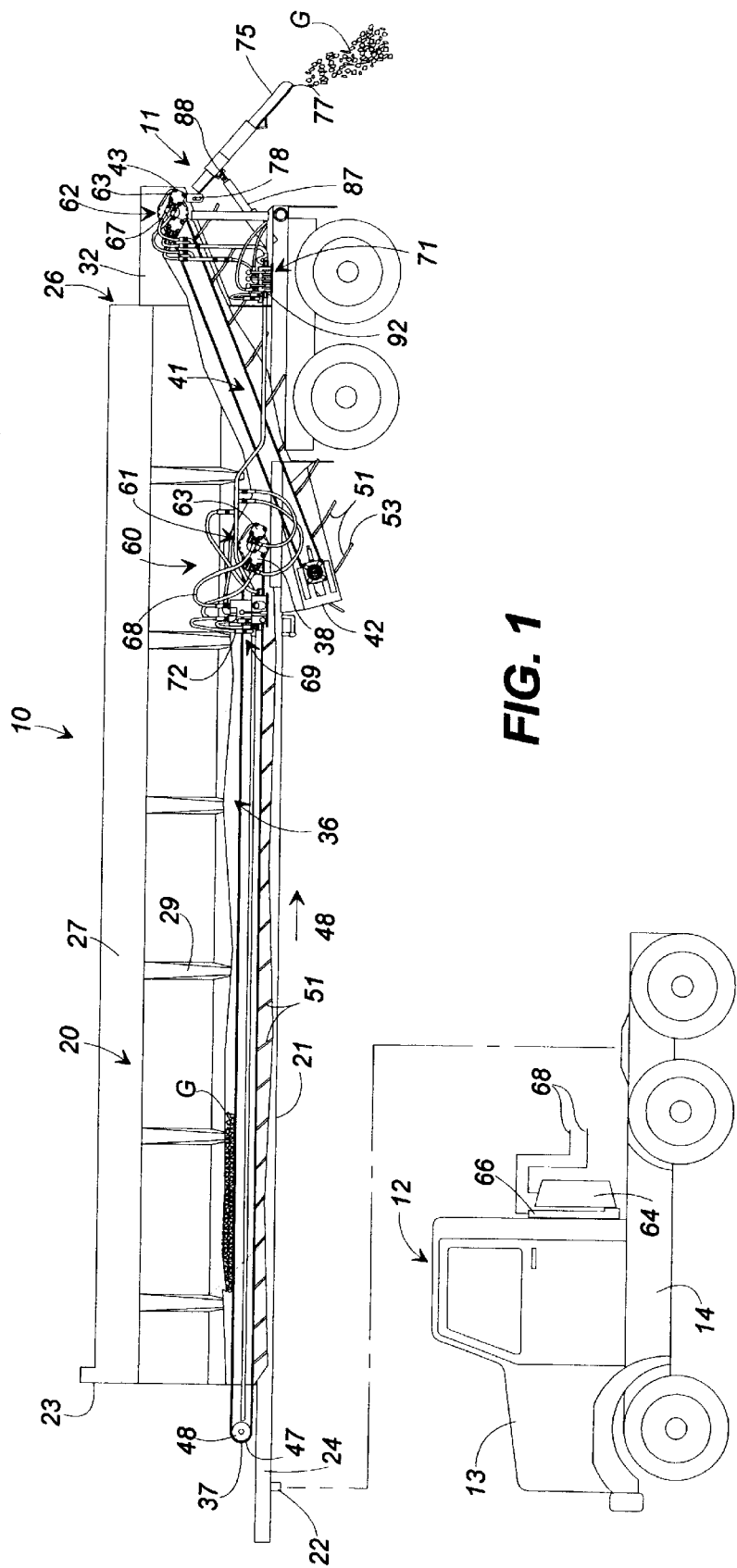
FIG. 1 is a side elevational view of the truck trailer with movable tailgate assembly of the present invention.

Referring now in greater detail to the drawings in which like numerals indicate like parts throughout the several views, FIG. I illustrates a truck trailer 10 with a movable tailgate assembly 11 attached to and driven by a truck or tractor-trailer rig 12. The truck typically is of a conventional type commonly used for pulling gravel hauling trailers or other types of trailers, including a cab 13 and a chassis 14. The truck trailer 10 is designed for hauling particulate or granular materials such as gravel, crushed rock, sand, dirt, feed and other similar materials, with gravel being used for illustrative purposes in the present embodiment. The truck trailer 10 includes a trailer body 20 mounted on a substantially flat frame or bed 21. The trailer body attaches to the truck 12 (FIG. 1) by use of a conventional hitch mechanism as indicated at 22. The trailer body is generally constructed from a metal such as steel or aluminum or similar durable, high strength material, and is elongated and substantially rectangular shaped, having a first or front end 23 that slopes downwardly, as illustrated in FIG. 2, toward the bottom 24 of the trailer body, a second, rear or discharge end 26 spaced from the front end 23, and a pair of side walls 27, 28 that slope inwardly toward the bottom 24 of the trailer body. The side walls, front and rear ends of the trailer body define an open basin or receptacle in which the gravel G or other particulate material is loaded and contained therein for hauling to a discharge site.

Figure 2:
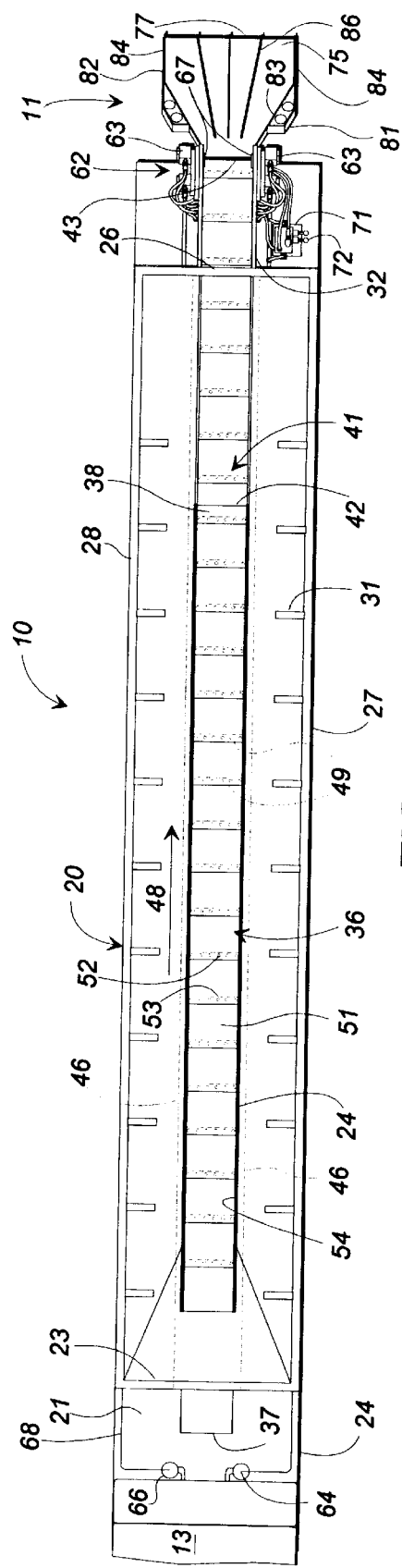
FIG. 2 is a plan view of the truck trailer with movable tailgate assembly of the present invention.

As FIGS. 1 and 2 indicate, a series of braces or struts 29 are welded to the side walls 27 and 28 along the outside of the trailer body 20 for strengthening the side walls and to provide additional support for the sides of the trailer body. In addition, internal ribs 31 are welded in spaced series along the interior of the side walls 27 and 28 for further strengthening the sloped side walls. A discharge chute 32 is mounted at the discharge end 26 of the trailer body, extending rearwardly therefrom for containing the gravel G as it is discharged from the trailer body.

Figure 3:
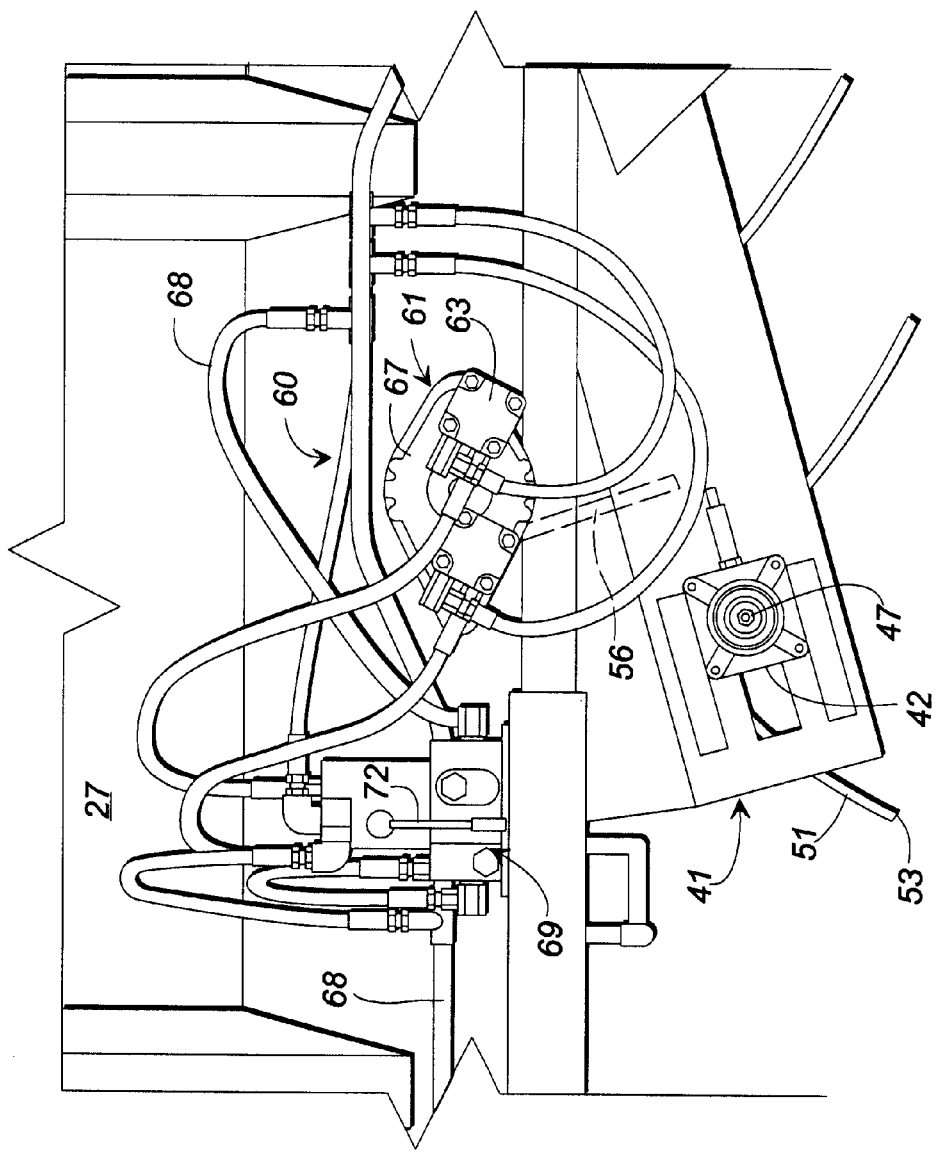
FIG. 3 is a side elevational view of the motor controls of the first conveyor of the truck trailer of FIG. 1.

As illustrated in FIGS. 1 and 3, a first conveyor 36 is positioned and extends along the bottom 24 of the trailer body 20 from the front end of the trailer body to an intermediate point approximately one-half to two-thirds down the length of the trailer body, and includes a front end 37 positioned adjacent the front end 23 of the trailer body, and a discharge end 38 positioned at the intermediate point along the trailer body spaced from the first end 37. The first conveyor acts as a first movable floor section for conveying the gravel from the front end of the trailer body toward the rear or discharge end thereof. A second conveyor 41 is mounted adjacent the rear of the trailer body 20, positioned at an angle with respect to the first conveyor 36, as indicated in FIG. 1. Typically, the second conveyor will be oriented between a 25° to 60° angle with respect to the first conveyor, or preferably at a 45° angle or 412 pitch. The second conveyor includes a first end 42 (FIG. 2) positioned below and slightly behind the second end 38 of the first conveyor 36, and a second or discharge end 43 positioned at the discharge end 26 of the trailer body, bounded on two sides by the discharge chute 32. The second conveyor acts as a second movable floor section that receives the gravel from the first conveyor and moves the gravel upwardly to a discharge position at the discharge chute at the rear of the trailer body for discharging the gravel therefrom.

Each of the conveyors 36 and 41 generally is constructed from a pair of endless conveyor chains, indicated at dashed lines 46 in FIG. 2, which are extended about a pair of spaced sprockets 47. Each of the sprockets positioned at the second or discharge ends of the first and second conveyors is mounted on a drive shaft (not shown) for driving the conveyors about an endless conveying path 48. The conveyor chains are spaced approximately 30" to 35" apart, with a series of cross braces, indicated generally by 49 to the chains mounted at spaced intervals on approximately threeinch centers. Each of the cross braces is formed from steel or similar metal and extends laterally between the chain so as to be carried with the chains as the chains are rotated about a conveying path indicated by arrows 49. A series of conveying members 51 are attached to the cross braces, with each of the conveying members being mounted so as to slightly overlap the conveying member immediately following it by approximately 3" to 4". Each of the conveying members generally is a flexible rubber belt or mat approximately 30" to 35" wide and 15" to 20" in length. The conveying members each include a leading end 52 attached to a cross brace, and a trailing end 53 that overlaps the succeeding conveying member. The conveying members are attached to the cross braces only at their leading ends 52 so that the conveying members can flex and move as the chains are rotated about their sprockets so as to cause the conveying members to roll over and urge the gravel off of the conveyor, for example to urge the gravel from the first conveyor to the second conveyor or from the second conveyor onto the tailgate assembly 11 as indicated in FIG. 1.

Gaskets or gussets 54, generally formed from rubber or similar flexible material, are mounted along the sides of the first and second conveyors, as shown in FIG. 2, overlapping the sides of the conveying members so as to shield or seal the sides of the first and second conveyors to prevent the gravel or other particulate matter from falling out of the bottom of the truck between the side walls of the truck and the first and second conveyors and possibly jamming or disrupting the operation of the chains of the first and second conveyors. In addition, a baffle or scraping blade 56 (FIGS. 1 and 3) is mounted just below and adjacent the second end 38 (FIG. 1) of the first conveyor 36, extending downwardly toward the second conveyor 41. The baffle 56 functions to prevent gravel from sliding or falling off of the second conveyor and dropping out of the bottom of the truck trailer as it is transferred from the first conveyor to the second conveyor. Typically, the baffle will be formed from a flexible material such as rubber, similar to the conveying members, or can be formed from a more rigid durable material such as metal, steel, aluminum or similar metals.

FIGS. 1, 3, 4 and 5 generally illustrate a drive system 60 for the first and second conveyors 36 and 41 (FIG. 1). The drive system 60 generally includes a first series of drive motors 61 for the first conveyor and a second series of drive motors 62 for the second conveyor 41. The drive motors can be any type of conventional variable speed motors 63 such as electric motors, but typically will be hydraulic drive motors, as illustrated in the present embodiment. A pair of hydraulic pumps 64 and 66 are mounted adjacent the cab 13 of the truck 12 and are connected to the power take-off of the truck. The hydraulic pumps generally are 25 gallon per minute segment pumps that are connected to and are operated off of the power take-off of the truck that is operated off of the truck transmission for driving the pumps. There is a separate hydraulic pump 63 and 64 for the first and second drive motors 61, 62, respectively, for each of the first and second conveyors. A series of hydraulic lines 68 connect the pumps 64 and 66 to their respective drive motors 61 and 62 for supplying hydraulic fluid thereto.

As indicated in FIG. 2, the drive motors for the first and second conveyors generally are arranged in pairs of motors 63 with one pair of drive motors being mounted on each side of the 15 conveyors. Each of the first and second conveyors also has gear boxes or transmissions 67 mounted on opposite sides of the conveyors attached to the drive shaft (not shown), at the second or discharge ends of the first and second conveyors for driving the first and second conveyors.

The drive motors 61 (FIG. 3) for the first conveyor generally are arranged in pairs of 12 horsepower hydraulic motors mounted on each side of the first conveyor for distributing the torque more evenly to provide a smoother operation of the first conveyor and to provide longer life for the motors. The drive motors 62 for the second conveyor generally will comprise two pairs of 10-horsepower hydraulic motors mounted in similar fashion to the hydraulic motors of the first conveyor as shown in FIG. 2.

As shown in FIG. 1, the first and second conveyors each have separate controls 69 and 71, with each set of controls being linked to the hydraulic lines 68 for controlling the operation of the hydraulic motors. The controls generally are variable speed controls for operating the drive motors of the conveyors at varying rates as needed. Typically, the hydraulic motors of the first conveyor will be operated at varying speeds so as to run the first conveyor at a slower speed than the second conveyor when necessary so as to prevent the second conveyor from becoming overloaded, with the second conveyor generally run at a constant full speed for discharging the gravel from the truck trailer. The controls each include at least one control lever 72 for actuating the drive motors.

Figure 4:
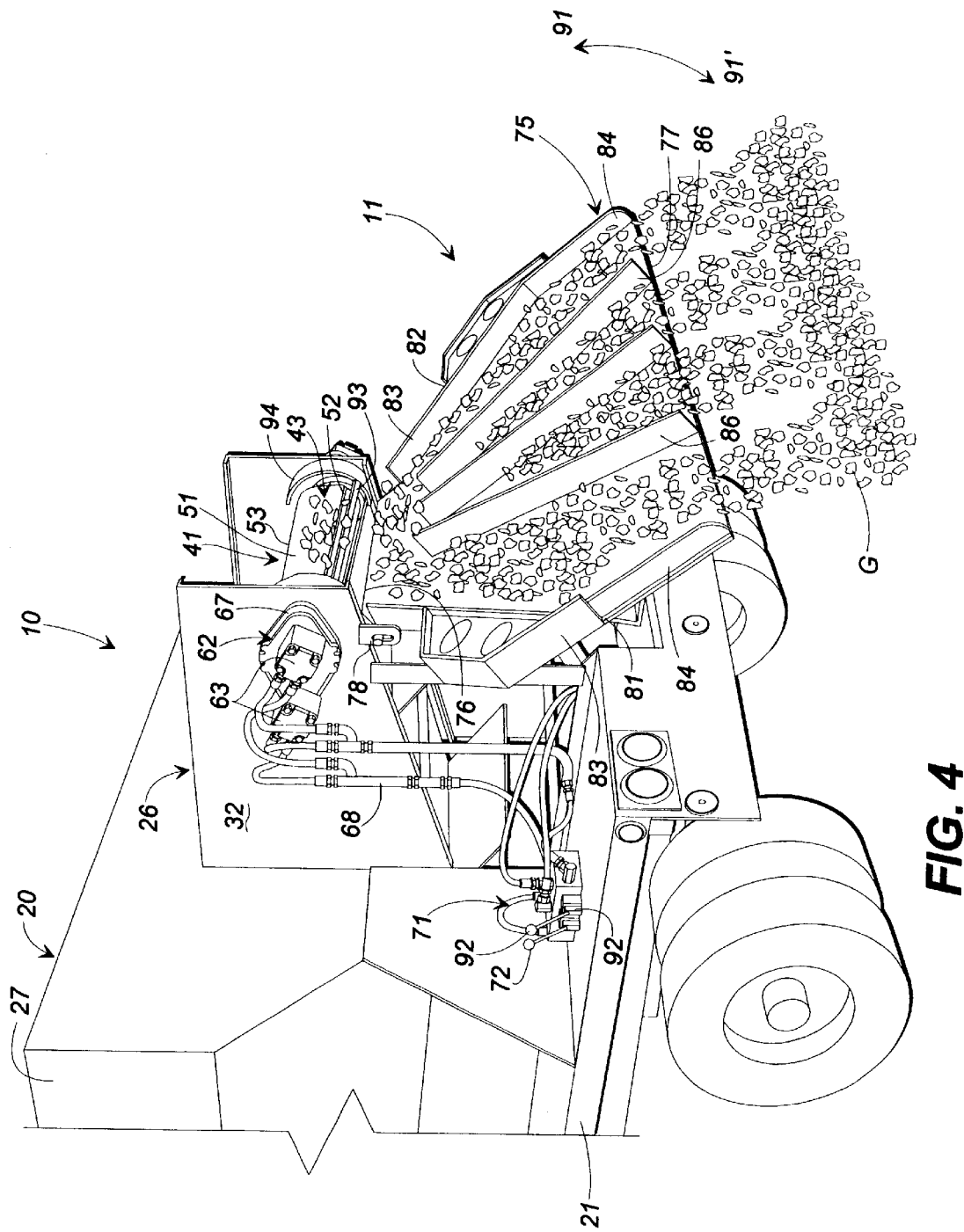
FIG. 4 is a perspective view of the tailgate assembly of the truck trailer of FIG. 1.
Figure 5:
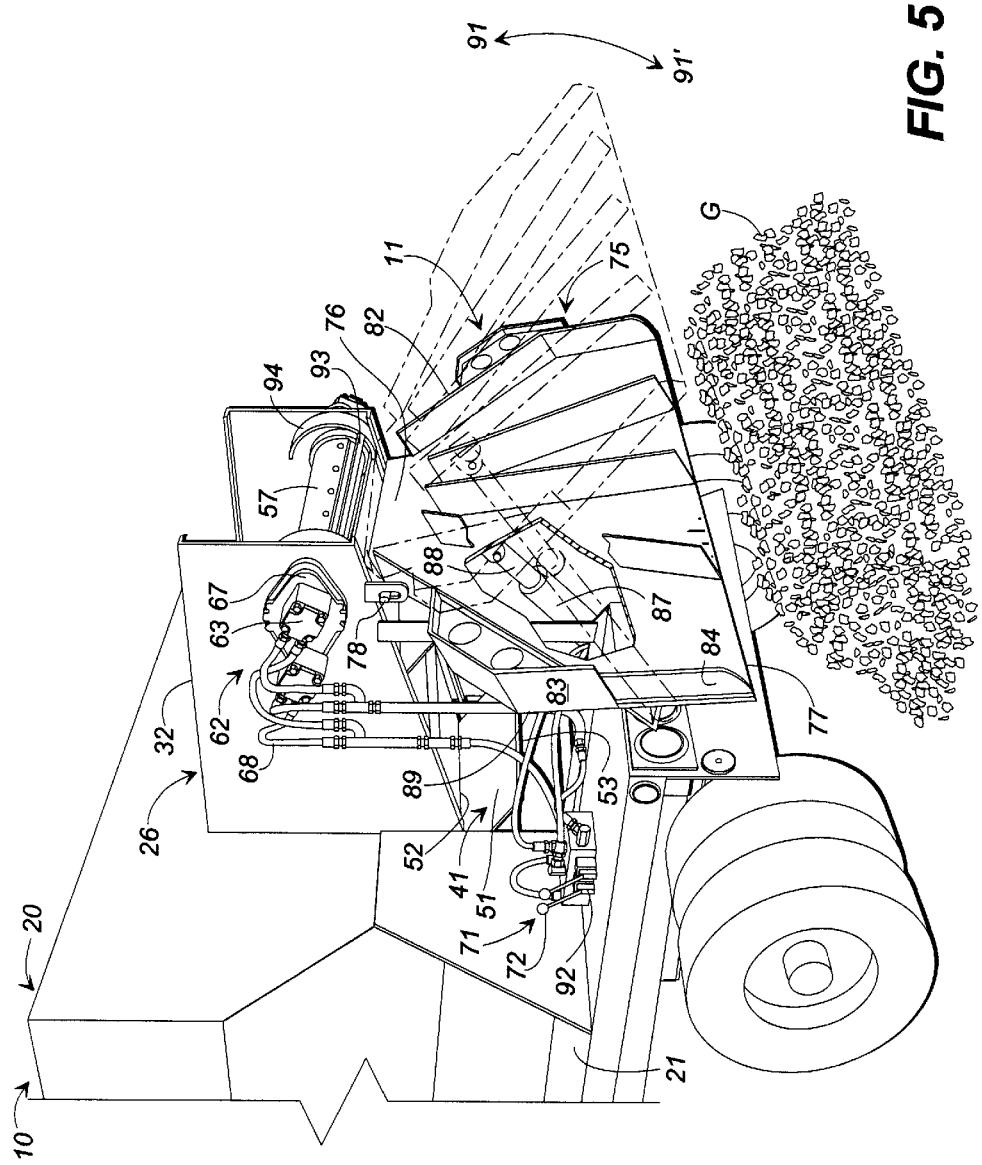
FIG. 5 is a perspective view of the tailgate assembly showing the tailgate being moved between raised and lowered positions for dumping the particulate material in piles and spreading the particulate material.

The tailgate assembly 11 of the truck trailer 10 is illustrated in greater detail in FIGS. 4 and 5. The tailgate assembly includes a movable tailgate 75 generally formed from steel or similar metal and having a substantially triangular shape or configuration with an upper end 76 and lower end 77. The tailgate is pivotally mounted to the discharge chute 32, typically by pivot pins or hinges 76 (FIG. 4), positioned adjacent the discharge end of the second conveyor 41 and mounted to the lower portion of the discharge chute 32. It is also possible to use a swivel or universal joint to enable the tailgate 75 to swivel or swing about the rear end of the trailer as well as to pivot vertically. The tailgate is movable between a fully lowered, non-engaging position as indicated in FIG. 5 through a series of spreading positions upwardly to a fully raised position illustrated in FIG. 1. When in its lowered position, the tailgate is positioned out of the way of the gravel or other particulate material being discharged from the trailer body by the second conveyor so as to cause the gravel to collect in discrete piles beneath the rear or discharge end of the trailer. In its raised, spreading positions, the tailgate is moved into the path or flow of the gravel as it is discharged from the second conveyor for spreading the gravel across a desired area.

As FIG. 4 illustrates, the tailgate includes a pair of outer side walls 81 and 82 each having an outwardly angled portion 83 and substantially straight portions 84. A series of partitions or dividers 86 are formed approximately in the center of the tailgate, or at an angle toward the outer side edges of the tailgate for channeling or guiding the gravel outwardly so as to cause the flow of gravel to be spread out as it is discharged off of the tailgate. Thus, as the truck is driven slowly across a site such as a roadbed, the gravel is distributed by the tailgate evenly and under control across a portion of the roadbed.

As FIGS. 1 and 5 illustrate, a hydraulic cylinder 87 is mounted to the trailer frame 21 and pivotally connects to the tailgate 75. Typically, the cylinder 87 is a 4-inch hydraulic cylinder, although greater or lesser sized cylinders can be used as desired, having a cylinder rod 88 that attaches to the rear side 89 of the tailgate 75. As the cylinder is actuated, its cylinder rod 88 is extended and retracted so as to cause the tailgate to be pivoted upwardly and downwardly in the direction of arrows 91 and 91' (FIG. 5) to move the tailgate between its lowered, non-engaging position and through its various spreading positions to its fully raised position. A separate hydraulic control such as a control lever 92 (FIG. 4) is provided in conjunction with the control 71 for the second conveyor 41 for controlling the operation of the cylinder 87 to raise and lower the tailgate to a desired elevation or position.

As illustrated in FIG. 4, a scraper blade 93 is mounted at the discharge end of the discharge chute 32, extending across the second or discharge end 43 of the second conveyor 41. The scraper blade is positioned so as to catch and scrape off any gravel or other matter that may be stuck to the conveying members of the second conveyor, and further prevents the conveying members from flipping upwardly and throwing gravel or other debris as they are rotated about their second or discharge ends. As a result, the gravel is directed downwardly under control onto the tailgate or into a pile beneath the discharge end of the trailer body. In addition, guides 94 also can be provided for engaging and preventing the conveying members from flipping upwardly and throwing rocks and other debris rearwardly as the conveying members are rotated about the sprocket at the second end of the second conveyor.

OPERATION

In the operation of the truck trailer with movable tailgate assembly of the present invention, gravel, crushed rock, sand and other particulate materials are loaded into the trailer body 20 of the truck trailer 10 (FIG. 1) through the open top of the truck trailer by a front-end loader or similar dumping mechanism. After the trailer body has been fully loaded, it generally is driven to a dump site such as a construction site for a new road or the like.

At the site, the operator first engages the hydraulic cylinder 87 for the tailgate assembly 11 so as to raise or lower the tailgate 75 to a desired position. If it is desired to dump portions of the gravel or particulate material load in discrete piles, the tailgate is left in its lowered, non-engaging position. If the gravel G is to be spread over a desired area, the operator engages the hydraulic cylinder and raises the tailgate into a partially or fully raised position as desired for spreading the gravel over a certain area with a certain thickness or amount. For example, as the tailgate is lowered, it directs a thicker pattern or layering of the gravel across a smaller or more dense area.

Once the tailgate has been moved to its desired position, the transmission of the truck is engaged so as to engage the power take-off and power the hydraulic pumps for the drive system 60. The second conveyor is then generally engaged and operates at a full speed, while the operator engages the first conveyor, typically running it at a slower speed than the operation of the second conveyor so as to not overload the second conveyor by passing too much gravel or other particulate material onto the second conveyor. If the gravel is being deposited in discrete piles, the truck remains stationary, however, if the gravel is to be spread over a prescribed area, the driver of the truck will generally drive the truck slowly over the prescribed area as the conveyors are engaged so as to cause the gravel to be spread over the prescribed area instead of being piled in a mass. The second conveyor receives the gravel or other material from the first conveyor and conveys it upwardly toward the top of the trailer body where it can be discharged under control and direction by the operation of the movable tailgate assembly.

Accordingly, it can be seen that the present invention provides a mechanism for hauling and dumping gravel, crushed rock, sand, feed and other particulate or granular materials that enables greater control and enables the materials to be dumped in discrete piles or spread over a prescribed area without requiring the trailer body to be raised for dumping the materials. This makes the use of the present invention much safer than conventional dump trailers and allows greater control in the discharge of the particulate materials and further creates less strain or torque on the truck or tractor rig pulling the trailer as it enables a more even load distribution along the trailer body as the particulate material is discharged therefrom, especially on steep grades and uneven terrain.

It further will become understood to those skilled in the art that while the present invention has been described with reference to a preferred embodiment, various modifications, additions and deletions can be made to the present invention without departing from the spirit and scope of this invention as set forth in the following claims.

What is claimed is:

1. A trailer assembly for dumping and spreading gravel, sand, soil and other particular material, attached to at truck cab and comprising:

a trailer body having a front end and a discharge end;

a first conveyor having a first end and a second end and extending along said trailer body from said front end to an intermediate position along said trailer body for conveying the particulate material along a conveying path toward said discharge end;

a second conveyor mounted within said trailer body, having a first end positioned below said second end of said first conveyor so as to be overlapped by said second end of first conveyor and extending upwardly toward a second end positioned at said discharge end of said trailer body for moving the particulate material upwardly and to an elevated position at said discharge end of said trailer body;

said first and second conveyors each including a series of flexible conveying members mounted in series along each said conveyor in an overlapped configuration; and a tailgate assembly mounted adjacent said second end of said second conveyor, having an expanded configuration and being selectively moveable between a lowered position out of said conveying path for dumping the particulate material in piles at selected locations and a raised, spreading position within said conveying path as desired for receiving and directing the particulate material to be spread over a desired area.

2. The trailer assembly of claim 1 and further including a means for driving said first conveyor and means for driving said second conveyor.

3. The trailer assembly of claim 2 and wherein said means for driving said first conveyor comprises at least one motor connected in a driving relationship to said first conveyor, and said means for driving said second conveyor comprises at least one motor connected in a driving relationship to said second conveyor.

4. The trailer assembly of claim 2 and wherein said means for driving each of said first and second conveyors includes a hydraulic pump and at least one motor connected to each of said first and second conveyors and to said pump for driving said conveyors.

5. The trailer assembly of claim 1 and further including a pneumatic cylinder mounted to said tailgate assembly for moving said tailgate assembly between said lowered and raised positions.

6. The trailer assembly of claim 1 and wherein said first and second conveyors comprise a pair of spaced chains moving along an endless path, cross members mounted at spaced intervals along said chains, and flexible conveying members mounted to said cross members for supporting and conveying the particulate material.

7. The trailer assembly of claim 1 and wherein said tailgate assembly includes a tailgate having a series of positions formed thereon for spreading the particulate material.

8. The trailer assembly of claim 1 and wherein said second conveyor is mounted at an angle with respect to said first conveyor.

9. A truck trailer of the type attached to and driven by a truck for transporting and dumping particulate material such as gravel, sand, dirt, feed and the like, said trailer comprising:

a trailer body having a front end, a discharge end and side walls defining a containment area for the particulate material being transported;

a first conveyor having a first end and a second end and extending along a bottom portion of said trailer body so as to form a first movable floor section of said trailer body for moving the particulate material from said front end of said trailer body to an intermediate point along said trailer body;

a second conveyor having a first end positioned below said second end of said first conveyor so as to be overlapped by said second end of said first conveyor and a second end positioned at said discharge end of said trailer body, said second conveyor extending upwardly at an angle with respect to said first conveyor, forming a second movable floor section of said trailer body, and adapted to receive and move the particulate material upwardly and toward said discharge end of said trailer body; and a movable tailgate assembly mounted at said discharge end of said trailer body adjacent said second end of said second conveyor, said tailgate assembly including a tailgate that is configured to direct the particulate material in a desired arrangement and which is pivotally mounted to said trailer body adjacent said discharge end so as to be selectively movable between a lowered, inoperative position so that the particulate material can be discharged from said trailer body in discrete piles at desired locations, and a raised position for receiving and spreading the particulate material across a desired area as the particulate material is discharged from said trailer body.

10. The truck trailer of claim 9 and further including a means for driving said first and second conveyors connected to and powered by the truck to which the trailer is attached.

11. The truck trailer of claim 10 and wherein said means for driving said first and second conveyors comprises a series of motors connected in a driving relationship to said first and second conveyors respectively.

12. The truck trailer of claim 10 and wherein said means for driving comprises a first set of drive motors, arranged in pairs, connected to said first conveyor, and a second set of drive motors, arranged in pairs, connected to said second conveyor.

13. The truck trailer of claim 9 and further including a pneumatic cylinder mounted to said tailgate for moving said tailgate between said lowered and raised positions.

14. The truck trailer of claim 9 and wherein said first and second conveyors comprise a pair of spaced chains moving along an endless path, cross members mounted at spaced intervals along said chains, and flexible conveying members mounted to said cross members for supporting and conveying the particulate matter.

* * * * *